(12) United States Patent
Soderquist

(10) Patent No.: US 12,144,335 B2
(45) Date of Patent: Nov. 19, 2024

(54) FISH PHOTOGRAPH AND RELEASE BAG

(71) Applicant: Reel Swede Enterprises LLC, South Haven, MI (US)

(72) Inventor: Richard Soderquist, South Haven, MI (US)

(73) Assignee: Reel Swede Enterprises LLC, South Haven, MI (US)

( * ) Notice: Subject to any disclaimer, the term of this patent is extended or adjusted under 35 U.S.C. 154(b) by 111 days.

(21) Appl. No.: 17/466,524

(22) Filed: Sep. 3, 2021

(65) Prior Publication Data
US 2023/0070360 A1    Mar. 9, 2023

(51) Int. Cl.
*A01K 97/00* (2006.01)
*A01K 97/20* (2006.01)
*G01B 3/02* (2020.01)
*G03B 15/00* (2021.01)

(52) U.S. Cl.
CPC .............. *A01K 97/20* (2013.01); *G01B 3/02* (2013.01); *G03B 15/00* (2013.01)

(58) Field of Classification Search
CPC .................................................... G03B 15/00
See application file for complete search history.

(56) References Cited

U.S. PATENT DOCUMENTS

| 1,317,532 | A | * | 9/1919 | Watkins | A01K 97/20 |
| 3,003,278 | A | * | 12/1959 | Armentrout | A01K 97/00 |
| 5,799,435 | A | * | 9/1998 | Stafford | A01K 97/05 |
|  |  |  |  |  | 43/57 |
| 5,906,067 | A | * | 5/1999 | Layson | A01K 97/00 |
|  |  |  |  |  | 43/2 |
| 10,021,867 | B2 | * | 7/2018 | Tipton | A01K 97/20 |
| 2007/0169400 | A1 | * | 7/2007 | Ball | A01K 97/20 |
|  |  |  |  |  | 43/55 |
| 2007/0289199 | A1 | * | 12/2007 | Looney | A01K 97/06 |
|  |  |  |  |  | 43/54.1 |
| 2012/0128276 | A1 | * | 5/2012 | Ortego | B65D 30/04 |
|  |  |  |  |  | 383/117 |
| 2013/0043251 | A1 | * | 2/2013 | Hendey | B65D 55/16 |
|  |  |  |  |  | 220/375 |
| 2017/0000099 | A1 | * | 1/2017 | Wanke | A01K 97/00 |

OTHER PUBLICATIONS

Berkley, Berkley Heavy Duty Fish Bag, 2016 (Year: 2016).*

* cited by examiner

*Primary Examiner* — Joshua J Michener
*Assistant Examiner* — Henry Hooper Mudd
(74) *Attorney, Agent, or Firm* — FLYNN THIEL, P.C.

(57) ABSTRACT

A fish holding bag comprising a front panel and a rear panel. The front panel has at least a portion thereof being transparent and includes visible measurement markings thereon for measuring a length of a fish in the fish holding bag. The rear panel is connected to the front panel such that a fish holding area is located between the front panel and the rear panel. A bag includes a resealable closure for selectively opening and closing a top opening located between the front panel and the rear panel, with the top opening providing access to the fish holding area. A plurality of tabs extend outwardly from the front panel and rear panel and connected thereto, with each of the tabs having a grommet surrounding a hole in the tabs. The bag further includes a handle for holding the fish holding bag.

21 Claims, 4 Drawing Sheets

FISH PHOTOGRAPH AND RELEASE BAG

FIELD OF THE INVENTION

The present invention relates to a fish holding bag, and in particular to a fish photograph and release bag.

BACKGROUND OF THE INVENTION

Tournament fishing wherein fishermen compete for prizes based on the total weight and/or length of a given species of fish caught within a predetermined time has become very popular. An easier manner of recording the caught fish is desired.

SUMMARY OF THE INVENTION

The present invention, according to one aspect, is directed to a fish holding bag comprising a front panel and a rear panel. The front panel has at least a portion thereof being transparent and includes visible measurement markings thereon for measuring a length of a fish in the fish holding bag. The rear panel is connected to the front panel such that a fish holding area is located between the front panel and the rear panel. A bag includes a resealable closure for selectively opening and closing a top opening located between the front panel and the rear panel, with the top opening providing access to the fish holding area. A plurality of tabs extend outwardly from the front panel and rear panel and connected thereto, with each of the tabs having a grommet surrounding a hole in the tabs. The bag further includes a handle for holding the fish holding bag.

Yet another aspect of the present invention is to provide a fish holding bag comprising a front panel having a transparent portion, with the transparent portion having visible measurement markings thereon for measuring a length of a fish in the fish holding bag, and a rear panel connected to the front panel such that a fish holding area is located between the front panel and the rear panel. The bag also includes a resealable closure for selectively opening and closing a top opening located between the front panel and the rear panel, with the top opening providing access to the fish holding area. The bag further includes a plurality of tabs extending outwardly from the front panel and rear panel and connected thereto, with each of the tabs having a connection feature, and a handle for holding the fish holding bag. At least one water device is removably connected to the tabs.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

Figure 1:
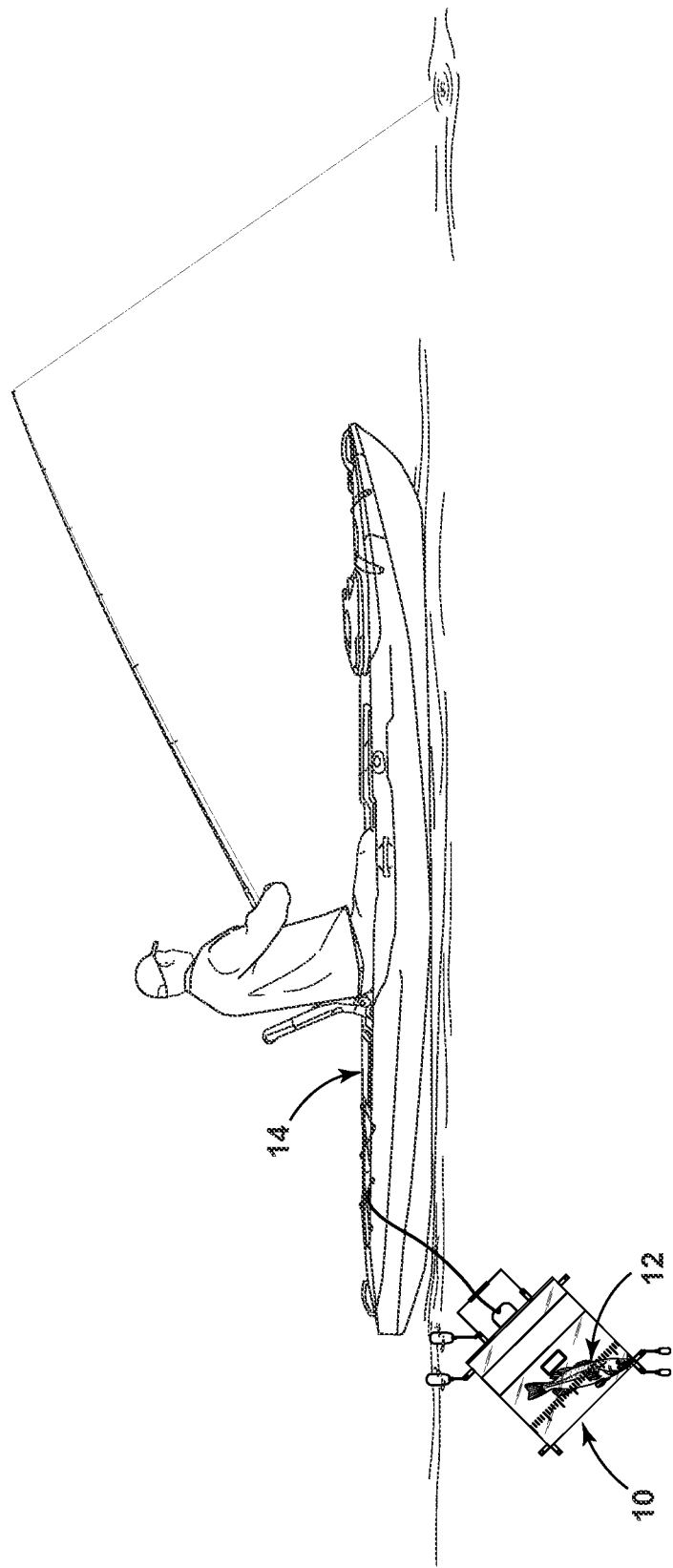
FIG. 1 is a side view of a fish photograph and release bag of the present invention connected to a watercraft.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 2-4) generally designates a fish photograph and release bag of the present invention. The fish photograph and release bag 10 as disclosed herein can be used to hold fish 12. Such fish 12 can be caught in tournament fishing wherein fishermen compete for prizes based on the total weight and/or length of a given species of fish 12 caught within a predetermined time. The fish photograph and release bag 10 allows the fish 12 to be easily photographed, weighed, measured for size and released. The fish photograph and release bag 10 can also be placed in water while holding the fish 12 and connected to a watercraft 14, which can make it easier to hold the fish 12 while using smaller watercraft 14 such as kayaks.

The illustrated fish photograph and release bag 10 is configured to securely hold the fish 12 within a fish holding area 16 therein. The fish holding area 16 is located between a front panel 18 and a rear panel 20 of the fish photograph and release bag 10. The front panel 18 and the rear panel 20 can be directly connected to each other to define the fish holding area 16 or a strip of material can connect the front panel 18 and the rear panel 20. It is also contemplated that the front panel 18 could be connected directly to the rear panel 20 in some portions and at least one strip of material could connect the front panel 18 and the rear panel 20 in other portions. The fish photograph and release bag 10 includes a top opening at a top of the fish holding area 16 to allow water and the fish 12 to be placed into and taken out of the fish photograph and release bag 10. The top opening can include a resealable closure 22 for selectively opening and closing the top opening and thereby the fish holding area 16. In the illustrated example, the resealable closure 22 is a zipper. However, other resealable closures 22 or combinations of resealable closures 22 can be employed (for example, hook and loop type fasteners or a combination of a zipper and hook and loop type fasteners).

Figure 2:
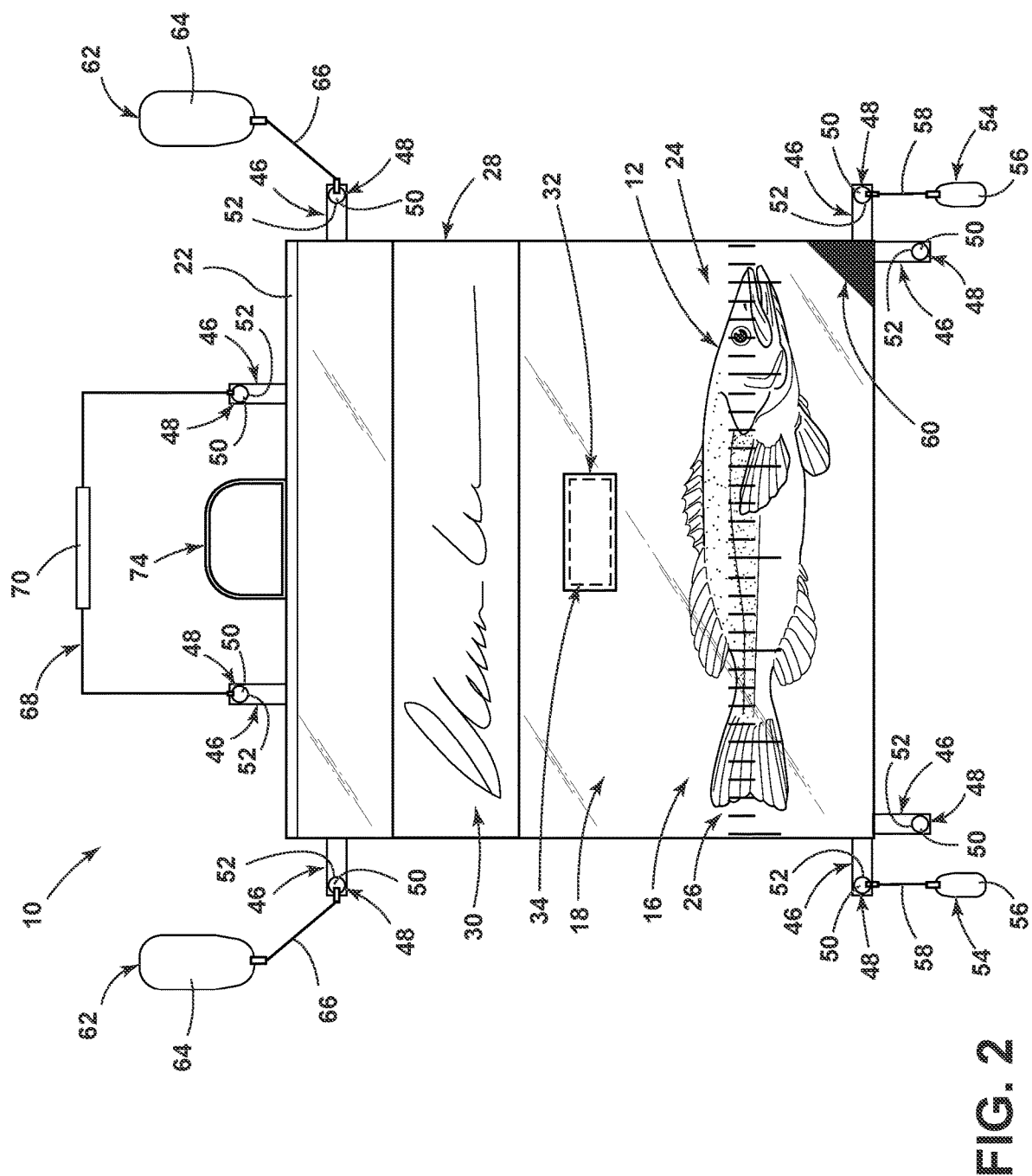
FIG. 2 is a first front view of the fish photograph and release bag of the present invention.
Figure 4:
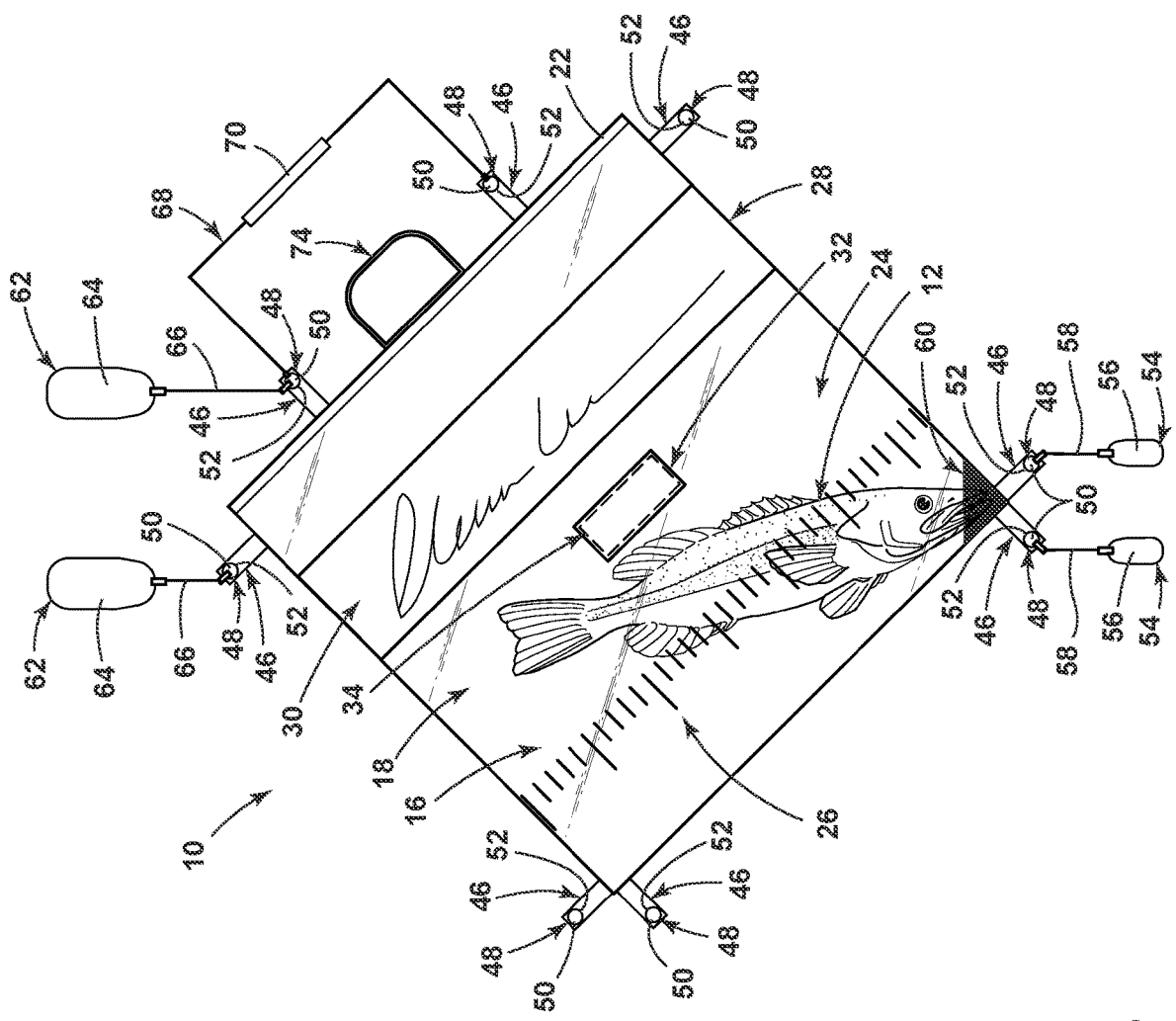
FIG. 4 is a second front view of the fish photograph and release bag of the present invention in a tilted configuration and with different elements connected thereto.

The illustrated fish photograph and release bag 10 allows fish 12 to be viewed while being held within the fish holding area 16. Therefore, the front panel 18 includes at least a portion 24 thereof that is transparent. The transparent portion 24 allows the fish 12 to be viewed and can include visible measurement markings 26 (e.g., inch divisions, centimeter divisions, etc.) for allowing a size (e.g., length) of fish 12 to be measured while the fish 12 is in the fish holding area 16. As shown in FIGS. 2 and 4, the front panel 18 can include a label area 28 having a marking 30 thereon or therein. For example, the label area 28 can include a logo or advertising on the front panel 18. The label area 28 can include the marking 30 printed directly on an exterior surface thereof or the label area 28 can be a pocket having a card inserted therein visible through a transparent front surface of the pocket. If a pocket is employed, an opening to the pocket can be maintained open or can be sealable. For example, the opening to the pocket can be closed by a zipper, a hook and loop type fastener, a slider, a tongue and groove fastener, or combinations thereof.

In the illustrated example, the fish photograph and release bag 10 can include location or identification elements. For example, the front panel 18 can include a locator or identification pocket 32. The locator or identification pocket 32 can include an open side for allowing an identification tag or kayak tag 34 to be inserted therein. The opening to the locator or identification pocket 32 can be maintained open or can be sealable. For example, the opening to the locator or identification pocket 32 can be closed by a zipper, a hook and loop type fastener, a slider, a tongue and groove fastener, or combinations thereof. The locator or identification pocket 32 can be transparent such that the identification tag or kayak tag 34 can be viewed and photographed from an exterior of the fish photograph and release bag 10. It is also contemplated that the identification tag or kayak tag 34 could be a device for allowing for GPS location capabilities to determine the location of the fish photograph and release bag 10 and/or the location of where the fish 12 was caught. It is contemplated that the identification tag or kayak tag 34 that allows for GPS location capabilities can include RFID capabilities that can communicate with nearby devices (e.g., a cellular phone of the person in the watercraft 14).

Figure 3:
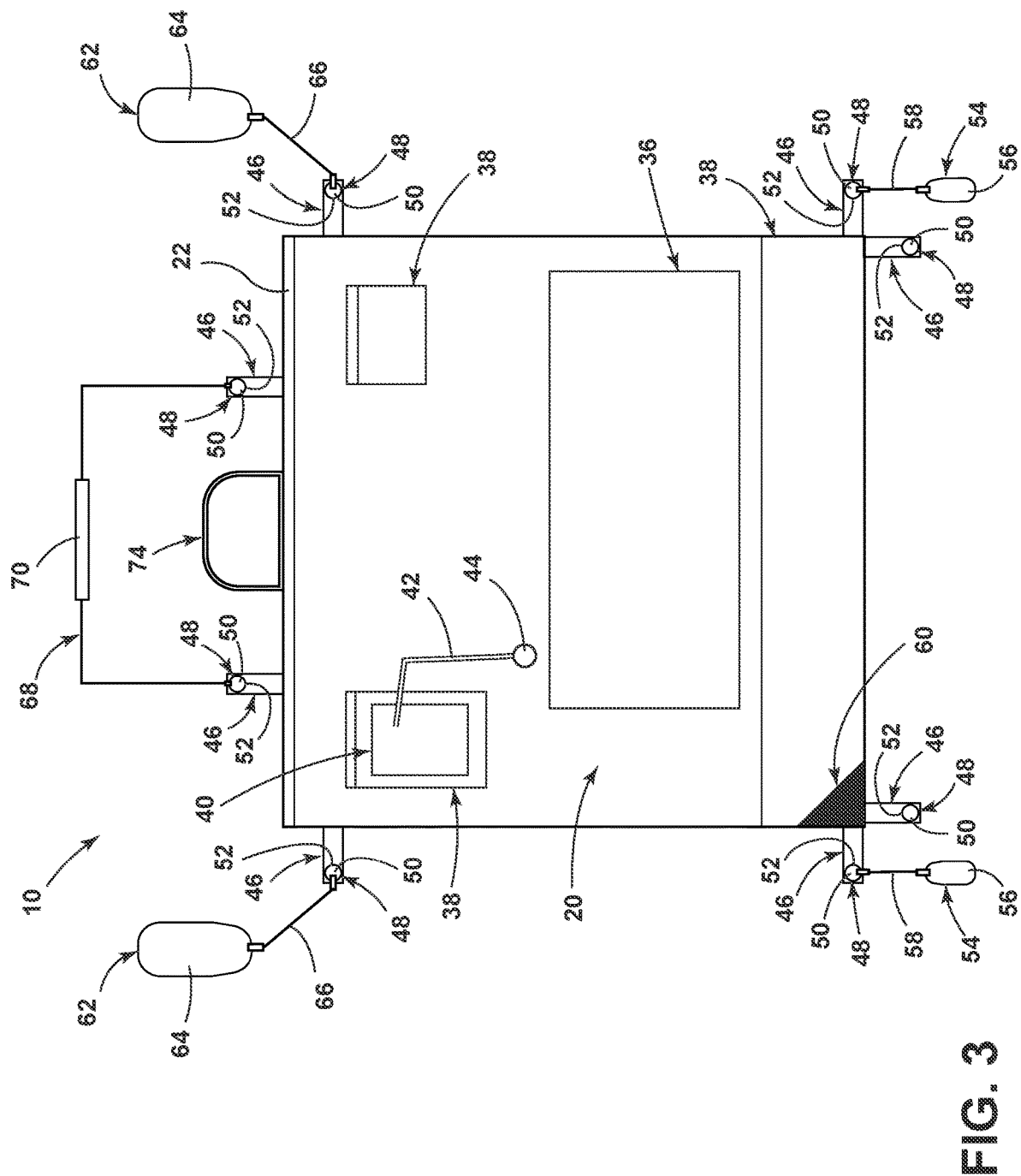
FIG. 3 is a rear view of the fish photograph and release bag of the present invention.

The illustrated fish photograph and release bag 10 can include information and devices on or in the rear panel 20. The rear panel 20 can be transparent, translucent, opaque or combinations thereof. As shown in FIG. 3, the rear panel 20 can include a rear design area 36. The rear design area 36 can include markings or a picture thereon or therein. For example, the rear design area 36 can include a logo, picture or advertising printed thereon. The rear design area 36 can be a pocket having a card inserted therein visible through a transparent front surface of the pocket. If a pocket is employed, an opening to the pocket can be maintained open or can be sealable. For example, the opening to the pocket can be closed by a zipper, a hook and loop type fastener, a slider, a tongue and groove fastener, or combinations thereof.

The illustrated rear panel 20 can also include further pockets 38 that can have a top opening that remains open or can be sealable (for example, by using a zipper, a hook and loop type fastener, a slider or a tongue and groove fastener). Many different devices can be placed into the further pockets 38. For example, one of the further pockets 38 can contain an air pump 40 (e.g., an air stone pump) for supplying air to water within the fish holding area 16. Such air pumps 40 are well known to those skilled in the art. The air pump 40 can include an air tube 42 that extends out of the further pocket 38 and through a hole 44 in the rear panel 20 for supplying air directly to the fish holding area 16. If an air pump 40 is employed, it is contemplated that the further pocket 38 holding the air pump 40 will be located above the water line or the further pocket 38 will be connected to with a source of air (e.g., by a tube) located above the water line. It is further contemplated that one of the further pockets 38 could include liquid or solid water conditioner for helping keep the fish 12 in the fish holding area 16 healthy. For example, the water condition could be G-Juice Livewell Treatment and Fish Care Formula sold by T.H. Marine of Huntsville, Alabama. If liquid water conditioner is used, it is contemplated that the layer of material between the pocket 38 and the fish holding area 16 can allow for transmission of the water conditioner into the fish holding area 16 (e.g., perforated).

In the illustrated example, the fish photograph and release bag 10 includes a plurality of tabs 46 for connecting various devices to the fish photograph and release bag 10. In the illustrated example, the tabs 46 extend outwardly from the front panel 18 and rear panel 20 and are connected thereto. The tabs 46 can extend from the front panel 18, the rear panel 20, an intersection thereof or from a strip between the front panel 18 and the rear panel 20 as outlined above. All of these configurations are considered to be extending outwardly from the front panel 18 and the rear panel 20 and connected thereto. Each of the tabs 46 can include a connection feature 48. As shown, the connection feature 48 is a hole 50 in the tabs 46. A grommet 52 can surround each of the holes 50 to reinforce the hole 50. The tabs 46 and grommets 52 can be made of any material (e.g., plastic, metal, cloth or combinations thereof). It is contemplated that other connection features such as clips could be used. While eight tabs 46 are shown, any number of tabs could be used.

The fish photograph and release bag 10 can have devices removably attached to the tabs 46 to assist in using the fish photograph and release bag 10. As shown in FIGS. 1-4, weights 54 can be connected to selected ones of the tabs 46 to keep the fish photograph and release bag 10 in the water. The weights 54 can include a dense portion 56 that is more dense than water and a connector 58 that connects to or extends through the hole 50 in the tab 46. The connector 58 can be any tool for connecting the weight 54 to the tab 46. For example, the connector 58 can be a string or rope with a clip on an end thereof that connects to the hole 50 in the tab 46. As shown in FIGS. 1-4, the tabs 46 can include a pair of tabs 46 that extend in perpendicular directions from each bottom corner of the fish photograph and release bag 10. If one or more of the weights 54 are used in a single corner such as that shown in FIGS. 1 and 4, the fish photograph and release bag 10 can be tilted in the water. It is also contemplated that the weights 54 can be connected to the fish photograph and release bag 10 at each bottom corner as shown in FIGS. 2 and 3 to maintain the fish photograph and release bag 10 level. It is further contemplated that the fish photograph and release bag 10 can include one or more reinforced corners 60 (e.g., the corner shown in FIGS. 1-4). The reinforced corner 60 can be made of a thicker portion of the same material as the front panel 18 and the rear panel 20 or a stronger and/or different material than that used for the front panel 18 and the rear panel 20. While only one corner is illustrated as being a reinforced corner 60, any number (including all) of the corners can be a reinforced corner 60.

The fish photograph and release bag 10 can also have floats 62 connected thereto as shown in FIGS. 1-4. The floats 62 can be connected to selected ones of the tabs 46 to keep the fish photograph and release bag 10 floating in the water. The floats 62 can include a buoyant portion 64 that is less dense than water and a connector 66 that connects to or extends through the hole 50 in the tab 46. The connector 66 can be any tool for connecting the floats 62 to the tab 46. For example, the connector 66 can be a string or rope with a clip on an end thereof that connects to the hole 50 in the tab 46. As shown in FIGS. 1-4, the tabs 46 can include a tab 46 that extends outwardly in perpendicular directions from each top corner of the fish photograph and release bag 10. If one or more of the floats 62 are used in a single corner such as that shown in FIGS. 1 and 4, the fish photograph and release bag 10 can be tilted in the water. It is also contemplated that the floats 62 can be connected to the fish photograph and release bag 10 at each top corner as shown in FIGS. 2 and 3 to maintain the fish photograph and release bag 10 level.

The illustrated fish photograph and release bag 10 can also include a removable beam 68 connected to a pair of top tabs 46. The beam 68 can be used as a handle and can be used as a balance beam to weigh the fish 12. The beam 68 can have a fixed configuration or can be flexible. The beam 68 can also include a grip portion 70 at a top thereof.

In the illustrated example, the fish photograph and release bag 10 includes a handle 74 fixed to a top thereof. The handle 74 can be connected to the front panel 18, the rear panel 20 or a strip between the front panel 18 and the rear panel 20. It is contemplated that the handle 74 could be buoyant to allow the fish photograph and release bag 10 to float on water if placed therein.

The illustrated fish photograph and release bag 10 can be very helpful for holding fish 12. The fish photograph and release bag 10 can be used to keep fish 12 not intended to be released and can give a quick measurement to see if the fish 12 is of a legal size for keeping. During tournaments, once a limited number of fish 12 have been caught, the fish photograph and release bag 10 can be used to quickly ascertain if an upgraded size fish has been caught, saving time from officially photographing a small fish that would not help improve the tournament score. The fish photograph and release bag 10 can also be used to transport the fish 12 to weigh in holding tanks which are sometimes used while waiting in line to have the fish 12 weighed by a tournament weigh master. The fish photograph and release bag 10 can also improve fish survival rate by providing oxygen etc. during transport.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A fish holding bag comprising:
   a front panel having at least a portion thereof being of transparent material, the front panel including visible measurement markings thereon for measuring a length of a fish in the fish holding bag;
   a rear panel connected to the front panel such that a fish holding area is located between the front panel and the rear panel;
   a resealable closure for selectively opening and closing a top opening located between the front panel and the rear panel, the top opening providing access to the fish holding area;
   a plurality of tabs extending outwardly from the front panel and the rear panel and connected thereto, each of the tabs having a grommet surrounding a hole in the tabs; and
   a handle for holding the fish holding bag.

2. The fish holding bag of claim 1, wherein the rear panel is directly connected to the front panel.

3. The fish holding bag of claim 2, wherein the tabs are connected to an intersection of the front panel and the rear panel.

4. The fish holding bag of claim 2, wherein the resealable closure is a zipper connected to the front panel and the rear panel.

5. The fish holding bag of claim 2, wherein the front panel and the rear panel are rectangular, and at least one connected corner of the front panel and the rear panel includes a reinforcement member.

6. The fish holding bag of claim 1, wherein the handle is buoyant.

7. The fish holding bag of claim 1, wherein the front panel and the rear panel include at least one pocket.

8. The fish holding bag of claim 1, wherein the front panel includes a pocket having an identification tag therein.

9. The fish holding bag of claim 1, further including at least one weight attached to one of the tabs via the hole therein.

10. The fish holding bag of claim 9, wherein the at least one weight is releasably attached to the one of the tabs.

11. The fish holding bag of claim 1, further including a first weight attached to a first one of the tabs via the hole in the first one of the tabs and a second weight attached to a second one of the tabs via the hole in the second one of the tabs.

12. The fish holding bag of claim 1, further including a weight attached to a first one of the tabs via the hole in the first one of the tabs and a float attached to a second one of the tabs via the hole in the second one of the tabs.

13. The fish holding bag of claim 12, wherein the weight is releasably attached to the first one of the tabs and the float is releasably attached to the second one of the tabs.

14. The fish holding bag of claim 1, wherein the rear panel includes a pocket having an air pump therein for supplying air to water in the fish holding area.

15. The fish holding bag of claim 1, further including a removable beam configured to support the fish holding bag as the fish holding bag is weighed.

16. A fish holding bag comprising:
    a front panel having a transparent portion of transparent material, the transparent portion having visible measurement markings thereon for measuring a length of a fish in the fish holding bag;
    a rear panel connected to the front panel such that a fish holding area is located between the front panel and the rear panel;
    a resealable closure for selectively opening and closing a top opening located between the front panel and the rear panel, the top opening providing access to the fish holding area;
    a plurality of tabs extending outwardly from the front panel and the rear panel and connected thereto, each of the tabs having a connection feature;
    a handle for holding the fish holding bag; and
    at least one water device removably connected to the tabs.

17. The fish holding bag of claim 16, wherein the rear panel is directly connected to the front panel.

18. The fish holding bag of claim 16, wherein the connection feature is a hole.

19. The fish holding bag of claim 16, wherein the at least one water device is a buoyant float.

20. The fish holding bag of claim 16, wherein the at least one water device is a weight.

21. The fish holding bag of claim 1, wherein the visible measurement markings are horizontally oriented.

* * * * *